United States Patent [19]
Dugan et al.

[11] 3,820,507
[45] June 28, 1974

[54] APPARATUS FOR INCUBATING AND HATCHING EGGS

[75] Inventors: James G. Dugan, Littleton, Colo.; Albert S. Hancock, Jr., Orange City, Iowa; Gene W. Hausske, Palmer Lake, Colo.; Kenneth G. Huston; Bernard L. Rosenberg, both of Denver, Colo.; Shirley M. Smith, Littleton, Colo.

[73] Assignee: Robbin Incubator Co., Denver, Colo.

[22] Filed: Jan. 21, 1972

[21] Appl. No.: 219,783

[52] U.S. Cl. ................................................ 119/35
[51] Int. Cl. ........................................... A01k 41/00
[58] Field of Search ......................... 119/35, 43–44, 119/39, 40

[56] References Cited
UNITED STATES PATENTS

| | | | |
|---|---|---|---|
| 783,182 | 2/1905 | DeMeyere | 119/35 |
| 1,545,425 | 7/1925 | Hillpot | 119/35 |
| 2,163,363 | 6/1939 | Markey | 119/35 |
| 2,334,865 | 11/1943 | Crawford | 119/35 |
| 2,646,930 | 7/1953 | Dryden | 119/35 |
| 2,791,199 | 5/1957 | Hamnett | 119/35 |

Primary Examiner—G. E. McNeil
Attorney, Agent, or Firm—Sheridan, Ross & Fields

[57] ABSTRACT

Process and apparatus for incubating and/or hatching eggs comprising a rectangular parallelepiped cabinet having an air conditioning bay or chamber, a plurality of parallel dolly bays adjacent one or both sides of the conditioning chamber, separated by impervious walls, and air ducting for delivering conditioned air flowing from the conditioning chamber to the dolly bays for serial flow therethrough and return to the conditioning chamber. The air flow path through adjacent bays may be in opposite vertical or opposite horizontal directions. Bay entry doors may be provided at one end or both ends of each bay.

7 Claims, 11 Drawing Figures

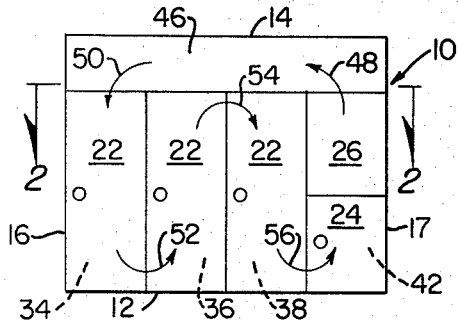
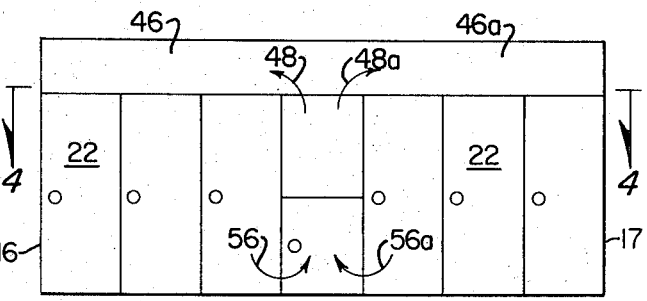
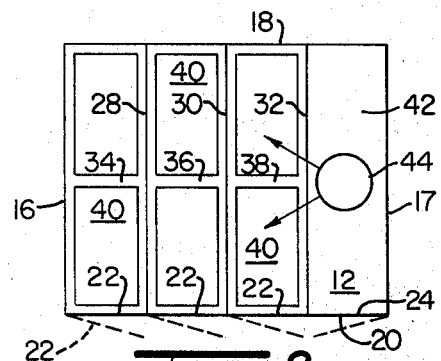
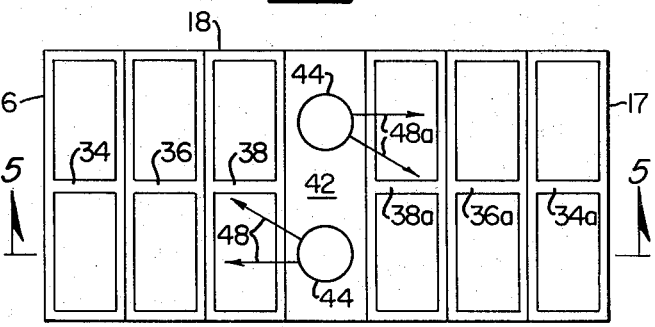
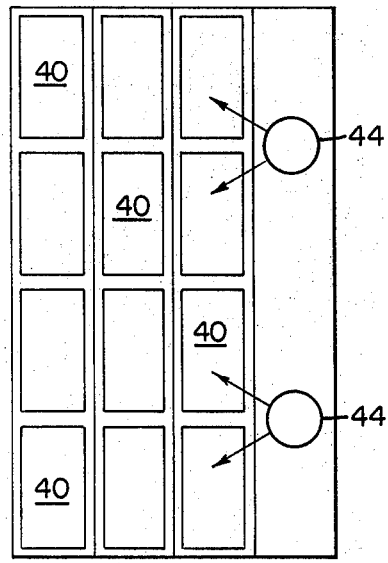
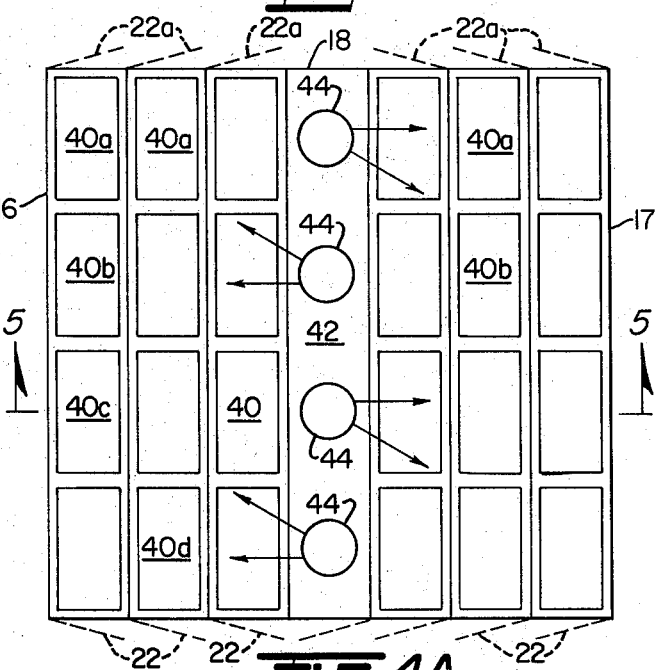
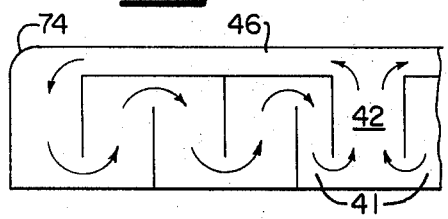

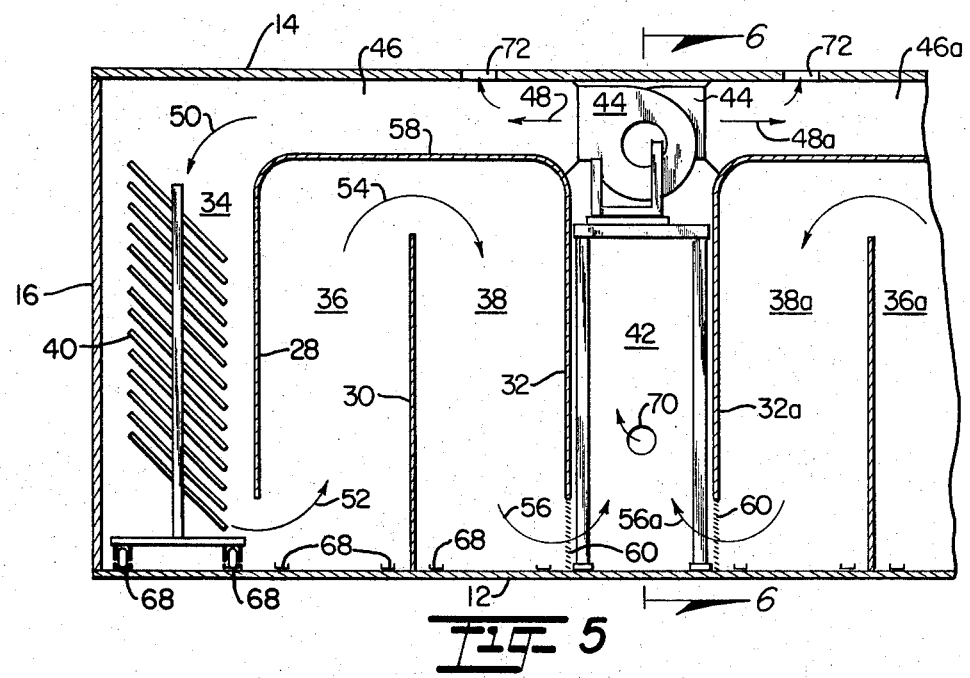
FIG. 5
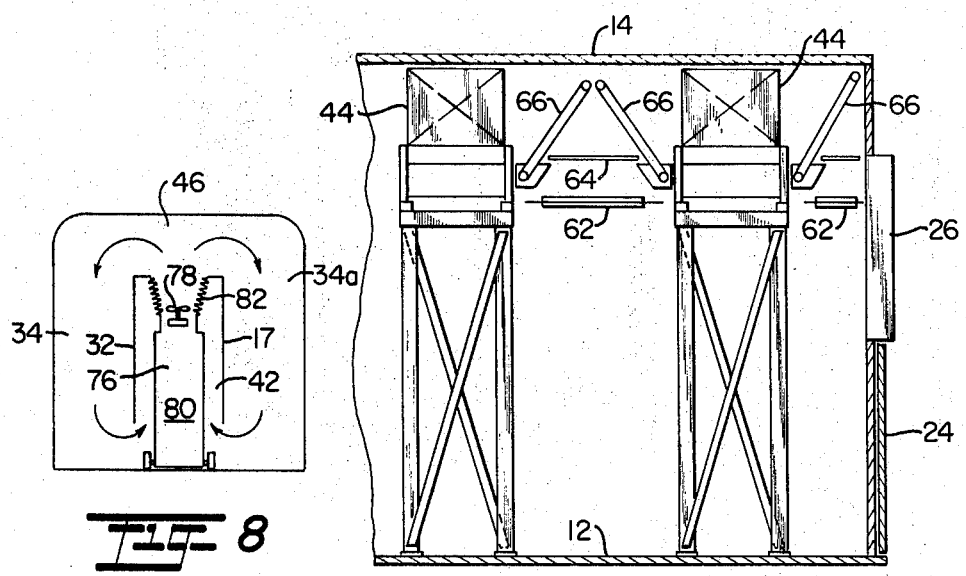
FIG. 8
FIG. 6
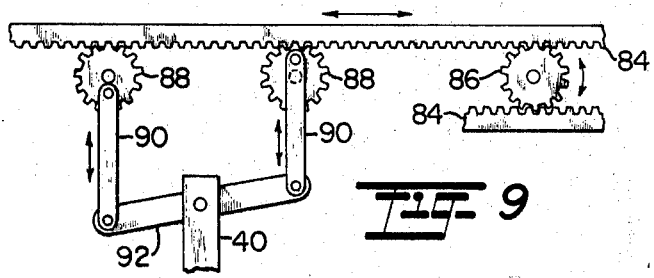
FIG. 9

APPARATUS FOR INCUBATING AND HATCHING EGGS

BACKGROUND OF THE INVENTION

As is well known, apparatus for incubating and hatching eggs in commercial quantities requires an enclosure, such as a cabinet, with suitable supports therein for the eggs and appropriate means for circulating air through the cabinet and conditioning same to maintain optimum temperature, humidity and gaseous mixture conditions.

A myriad of such devices have been proposed in this highly developed art and the presently more successful types employ, for example: cabinets divided into separated compartments or bays, each bay containing a large dolly or rack for supporting egg trays; cabinets without internal separating walls which contain a plurality of racks supported by the cabinet in which trays of eggs are placed; and, cabinets without internal separating walls into which a plurality of wheel supported racks or dollies, each holding trays of eggs of different ages, may be rolled. It is, of course, necessary and conventional practice to periodically tilt the eggs between certain angular positions.

Commercially successful processing of poultry or avian young depends upon precise control of the environmental conditions within the cabinet and, as is well known, conditions during the incubation period differ from those during the hatching period. It is also well known that embryo bioenergetic characteristics are such that egg heat production, carbon dioxide emission and oxygen intake are at a relatively low level during the first part of incubation (9-10 days for chicks), followed by a rapidly accelerating rate of the heat and gaseous interchanges, aforesaid, during the latter part of the incubation period and during the hatching period.

The bioenergetic factors just referred to have been employed with varying degrees of precision. In one form of apparatus, for example, the cabinet is separated into bays, each bay having its own air conditioning system which maintains its environmental conditions independent of the other bays. In this form of apparatus, the eggs in any one bay may be of any one age or an intermix of several ages. It is customary practice for all eggs to remain in the same location within the cabinet for the total incubation period, except that they are, of course, periodically tilted between certain angular positions. Such type is exemplified by incubators manufactured by the Robbins Incubator Co. of Denver, Colo. In another form of apparatus, the cabinet may have one or more large bays each of which contains a plurality of adjacent racks, the racks containing eggs of different ages. It is customary practice to move all racks intermittently through the cabinet, periodically entering racks with fresh unincubated eggs at an entry end thereof and removing the oldest eggs in racks from the exit end thereof at the requisite time. Thus, on a bi-weekly loading schedule, the ages of the eggs in the various racks could be 1, 4, 8, 11, 15 and 18 days. Such type is exemplified by incubators manufactured by Butler Manufacturing Company, Jamesway Division, Fort Atkinson, Wis. The Robbins type is believed to provide not only a more precise control and uniformity of conditions than the other type mentioned, but also a better control of sanitation.

Prior art apparatus also suffers, in varying degrees, from certain other disadvantages, such as: inaccessibility to various areas during operation for cleaning and maintenance; difficult and time consuming access for candling; inefficiency of egg handling; and lack of provision for positive guidance and control of the airflow.

SUMMARY OF THE INVENTION

The present invention obviates certain deficiencies of the prior art previously referred to by the provision of improved air flow control and air guidance which is attained by a plurality of adjacent egg rack bays through which air serially flows in such manner that the flow pattern is uniform through all portions of each bay and substantially the same in all bays. Such arrangement of bays provides improved access for cleaning, maintenance, and candling; less disturbance of egg environment while working; improved contamination control and conditioning; freedom from hatchery ambient conditions, and may be employed in various configurations and capacities for either incubation or hatching. In all versions, a single air conditioning chamber or bay is provided in which return air may be filtered and will be conditioned and mixed with fresh air received from either inside or outside of the building in which the apparatus is installed. A portion of the circulated air is exhausted from the apparatus through ducting to a point remote from the fresh air intake. A door is provided at one end of each bay in installations where racks must be rolled into or out of only one end of a bay, such as when the rear ends of the bays are disposed adjacent a wall. When not so disposed, however, and the work flow pattern of the racks or dollies is such that it is desirable to load and unload the bays in a single direction, a door may be employed at both ends of each bay.

The number of bays employed for weekly settings for chicks may be three at one side of the conditioning chamber and for bi-weekly settings may be six, three on each side of the conditioning chamber. For turkey eggs, which require a longer incubation period than chicken eggs, the number of bays may be four or eight, depending upon whether settings are weekly or biweekly. Air may flow through adjacent bays in opposite vertical directions or in opposite horizontal directions. Certain of the features employed in the larger versions may be incorporated in a small version having only two bays, one on each side of the air conditioning compartment, such design normally being employed as a hatcher rather than an incubator.

Objects of the invention thus include:

provision of serially communicating egg processing bays having improved air flow therethrough;

improved utilization of egg bioenergetic characteristics for interchange between eggs of different ages through serial flow of a common air mass through a plurality of egg bays separated by impervious walls;

provision of bays of various capacities which not only meet the production needs of the user but also economy of manufacture by reason of interchangeability of certain parts of the apparatus;

provision of bays of various configurations which may be selected according to available floor space and flow patterns of racks or dollies during their movement in a hatchery;

provision of bays of like construction but differing in capacity;

provision for improved processing of eggs;

provision of a hatcher in which the bioenergetic characteristics in two chambers mutually contribute, one to the other;

provision of improved sanitation, effective filtration, and easier cleaning;

achievement of greater economy by more efficient utilization both of space and of common controls and additional equipment, without sacrifice of other objectives;

still further objects, advantages and salient features will become more apparent from the detailed description to follow, the appended claims, and the accompanying drawings.

BRIEF DESCRIPTION OF THE DRAWINGS

FIG. 1 depicts a front elevation of a version of an incubator forming the subject of the invention;

FIG. 2 depicts a plan as viewed from plane 2—2, FIG. 1;

FIG. 2A is a like view of another version;

FIG. 3 is an elevation, like FIG. 1, of still another version;

FIG. 4 is a plan as viewed from plane 4—4, FIG. 3;

FIG. 4A is a like view of an additional version;

FIG. 5 is a partial section taken on line 5—5, FIGS. 4 and 4A;

FIG. 6 is a section taken on line 6—6, FIG. 5;

FIG. 7 illustrates a four or eight incubator bay arrangement particularly applicable for incubating turkey eggs;

FIG. 8 illustrates a two bay egg processing device, employed principally as a hatcher, which may be used with any of the incubators illustrated; and FIG. 9 illustrates egg tilting apparatus.

DESCRIPTION OF PREFERRED EMBODIMENTS

The invention, as explained more fully below, has application in both incubators and hatchers. Therefore, the term "incubation apparatus" as used in the specification and claims is intended to be generic to and refer to both incubators and hatchers.

Referring now to the drawings, and first to FIGS. 1 and 2, incubator 10 is of rectangular parallelepiped configuration comprising a bottom wall 12, top wall 14, side walls 16,17 and rear wall 18. Front wall 20 includes three hinged doors 22,22,22, a hinged access door 24 and a control panel 26. As will subsequently appear in more detail, vertical impervious common walls 28,30,32, separate an internal compartment of the incubator into bays 34,36,38, in which are disposed egg racks 40, and an air conditioning bay or chamber 42. A blower 44 provides air circulation in a manner to now be described.

Blower 44, which may be disposed at the top of air conditioning chamber 42, draws air from chamber 42 and discharges it into top duct 46 as indicated by narrow 48. It then flows downwardly in compartment 34 as indicated by arrow 50, thence upwardly in compartment 36 as indicated by arrow 52, thence downwardly in compartment 38 as indicated by arrow 54, returning to the bottom of chamber 42 as indicated by arrow 56.

Referring now to FIG. 2A, the construction is the same as in FIG. 2, except that the egg bays are twice the depth. As will be apparent, the capacity of the FIG. 2 construction is six egg racks whereas that of FIG. 2A is 12 racks.

Referring now to FIGS. 3 and 4, the construction is the same as in FIG. 2, except that three additional bays 34a, 36a, 38a are disposed at the other side of chamber 42. The air flow is the same as previously described except that the flow divides as indicated by arrows 48,48a. Thus, air flowing to duct 46a, as indicated by arrow 48a, finally returns to chamber 42 as indicated by arrow 56a.

The FIG. 4A construction is the same as in FIG. 4 except that the rack bays are twice the depth. As will be apparent, the capacity of this version is 24 egg racks.

Thus, with the same basic compartmentation, various rack capacities may be provided to suit the needs of the user, e.g. FIGS. 1 and 2 depict a small unit having a capacity of six racks; FIG. 2A depicts an intermediate unit having a capacity of 12 racks; FIG. 4 depicts another intermediate unit having a capacity of 12 racks, differing from FIG. 2A in bay configuration; and FIG. 4A depicts a larger unit like FIG. 2A having a capacity of 24 racks.

Referring now to FIGS. 5 and 6, walls 28,30,32,32a, etc., extend between front and rear walls 20,18. Walls 28,32,32a terminate above floor 12 to provide openings for air flow as indicated by arrows 52,56,56a and wall 30 terminates below wall 58 to provide an opening for air flow as indicated by arrow 54. Rectangular air filters 60 may be provided at the lower ends of walls 32,32a and between front and rear walls 20,18 to remove foreign matter from the air before it returns to the lower end of chamber 42. For the air flow indicated by arrows 52 and 54, similar filters may be provided between walls 30 and 58 and 28 and 12 to thereby separate bays, and therefore separate settings of eggs, by filtration, thus minimizing contamination exposure between bays and providing greater microbiological isolation. As best shown in FIG. 6, the recirculated air may be heated by an electric heater bar 62 or cooled by cooling coils 64 and humidified by humidifiers 66 before it enters the intakes of blowers 44. Thus, the air flowing to the blowers will be filtered, heated or cooled, and humidified on the intake sides of the blowers, the air flowing from the discharges of the blowers being conditioned before it enters ducts 46,46a.

Doors 22 pivot about vertical axes to permit openings through which wheel supported racks may be rolled along channel shaped guide tracks 68. Door 24 is hinged in like manner and provides access to chamber 42 and the various devices and controls therein. Control panel 26 is provided with the various controls and instruments for maintaining the air in the machine at desired conditions. It will be understood that the trays in the racks may be periodically tilted between predetermined angles by a mechanism to be subsequently described. Also, a suitable air intake 70 and exhausts 72 are provided to permit fresh air to enter chamber 42 and discharge air through the exhausts, these being controlled by adjustable valves or dampers (not shown).

Referring now to FIG. 7, the flow pattern is like that previously described except that four bays are provided on one or both sides of chamber 42 and a return duct (or ducts) 41 provides a return path to the lower end of chamber 42. The construction is particularly applicable for incubating turkey eggs, the incubation period of which is approximately 28 days. As will be apparent, if the settings are weekly, four bays may be provided and if the settings are bi-weekly eight bays may be provided, this figure being intended to illustrate either bay arrangement. Also, this figure may be considered as either a vertical section in which air flows through adjacent bays in opposite vertical direction or as a horizontal section in which air flows through adjacent bays in opposite horizontal directions. In addition to illustrating a four bay arrangement, rather than three bay arrangement, as in previously described figures, FIG. 7 thus also illustrates a modification of the previous figures in which the direction of air flow may be horizontal, rather than vertical.

As illustrated in FIG. 4, for example, the two blowers deliver air in opposite directions. It will be understood, however, that each blower may be of bi-directional type, dividing the flow equally in opposite directions. Regardless of the type employed, it is desired that the flow from the blowers be sufficiently diffused in the discharge duct (or ducts) so that it enters the top of a rack bay at uniform downward velocity across the top entry cross section of the bay so that all eggs are subjected to substantially the same air flow conditions.

As illustrated in FIG. 7, a curved baffle 74 may be provided at each end of discharge duct 46 in any of the embodiments to form streamline transition of air flow into the first bay to thereby obviate undesired turbulence and provide uniform air flow into the first bay. Also, if desired, directional control baffles (not shown) may be provided in discharge duct 46 to provide uniform discharge into the first bay which receives same.

While floor 12 has been illustrated as an integral part of the apparatus, it will be understood that the cabinet will usually be disposed on an existing floor of concrete or other waterproof material in which cases integral flooring is not required. Also, the various walls, etc. are preferably removably secured together to facilitate shipping the apparatus in knock-down form of minimized volume.

FIG. 8 illustrates a unit similar to those previously described except that only one compartment (34,34a) is disposed at each side of chamber 42. The depth of each compartment is preferably such that it accommodates two or more racks; however, if desired, the depth may be such that it may accommodate only one rack. This unit is used principally as a hatcher and when so used is not provided with any mechanism for periodically tilting the egg trays supported by the egg racks. To expedite servicing and cleaning, the entire air conditioning equipment 76, including fan 78, is mounted on a dolly 80 which may be rolled into or out of chamber 42. A detachable boot or sleeve 82 connects the fan outlet with the air delivery duct 46.

FIG. 4A also illustrates an alternative form of apparatus in which rear bay doors 22a are provided at the opposite ends from front bay doors 22. This door arrangement is desirable when the flow arrangement of the various incubators, hatchers and other equipment in the hatchery is such that movement of racks along the hatchery floor is expedited by moving racks in one direction through the bays. As will be apparent, doors 22a are not needed if the rear end of the apparatus is disposed against a wall of the hatchery building. As will be apparent, the front and rear door arrangement of FIG. 4A may be employed in any of the other figures.

As will be understood, the top of chamber 42 is suitably isolated from delivery duct 46 (or delivery ducts 46,46a) so that the only communication is through the blower (or blowers). Chamber 42 is thus a suction chamber at slightly lower static pressure than the delivery duct or ducts.

As previously referred to, the trays supported by the racks must be periodically tilted to angular positions at each side of tray horizontal position. Tilting devices are well known and any suitable type may be employed with the apparatus so far described. Preferably, however, the apparatus is employed with racks of a form disclosed in an application entitled "Egg Rack and Method of Handling Same" with the same inventors and assignee as this application and being filed concurrently herewith, which embodies an oscillatable shaft at its upper end to which is affixed a walking beam adapted to be oscillated by a power source and mechanism carried by the cabinet. An exemplary form of such mechanism is illustrated in FIG. 9 which comprises a pair of racks 84, oscillated by a pinion 86, connected to a power source (not shown) which operates cranks or sectors 88, connected by cables or other links 90 to walking beam 92 disposed on a rack 40. While only one bay drive is shown, it will be understood that the racks extend in both directions from the center of the cabinet and drive identical mechanism disposed above the ends of all bays at the end thereof provided with rack entry doors. Preferably, the pinion may be declutched from the power source and operated manually in the event of malfunction of its power drive or the timer control which periodically controls oscillation.

We claim:

1. Incubation apparatus for containing egg supporting means for holding eggs of one or more settings and having a substantially uniform and serial flow of air along a common path therethrough, said apparatus comprising:

a substantially closed air supply chamber including an air conditioning chamber and a duct assembly, said air conditioning chamber including means for controlling temperature and/or humidity in said apparatus and blower means for circulating the air through said apparatus;

a first plurality of adjacent bays for containing egg supporting means for holding eggs from one or more settings, each of said bays being separated from each other by an impervious common wall having at least one opening therethrough for the flow of air seriatim through said bays, said opening in any such common wall being offset from any opening in an opposite wall of each bay to which said common wall is common to facilitate flow of air at substantially uniform velocity, volume, temperature and humidity through substantially all portions of each bay, with the air flow in adjacent bays being in opposite directions, each of said bays including access means for placing the egg supporting means into and removing the egg supporting means from said respective bays;

inlet means connecting said duct assembly to a first bay at a point remote from said opening in said common wall connecting said first bay with an adjacent bay to provide air flow through substantially all portions of said first bay; and outlet means connecting the bay which is most remote from said first bay to said air conditioning chamber which is offset from the opening in the common wall between said remote bay and the next adjacent bay to provide air flow through substantially all portions of said remote bay so that air is circulated substantially uniformly by said blower seriatim along a common path through said duct assembly, each of said plurality of bays and said air conditioning chamber.

2. Apparatus in accordance with claim 1 wherein said openings in said walls are offset for flow of air through adjacent bays in opposite vertical directions.

3. Apparatus in accordance with claim 1 wherein said openings in said walls are offset for flow of air through adjacent bays in opposite horizontal directions.

4. Incubation apparatus, as claimed in claim 1, further including:
   filter means in said path to filter the air at least once during each passage thereof along said path.

5. Incubator apparatus, as claimed in claim 1, further including:
   a fresh air intake in said air conditioning chamber on the upstream side of said blower means; and
   an exhaust opening in said duct assembly on the downstream side of said blower means so that a portion of the air is replaced during each passage thereof along said path.

6. Incubation apparatus, as claimed in claim 1, wherein:
   said inlet means connects said duct assembly to the bay in said compartment most remote from said air conditioning chamber; and
   said outlet means connects the bay in said compartment which is closest to said air conditioning chamber to said air conditioning chamber.

7. Incubator apparatus, as claimed in claim 1, further including:
   a second plurality of adjacent bays for containing egg supporting means for holding eggs from one or more settings, each of said bays being separated from each other by an impervious common wall having at least one opening therethrough for the flow of air seriatim through said bays, said opening in any such common wall being offset from any opening in an opposite wall of each bay to which said common wall is common to facilitate flow of air at substantially uniform velocity, volume, temperature and humidity through all portions of each bay, with the air flow in adjacent bays being in opposite directions, each of said bays including access means for placing the egg supporting means into and removing the egg supporting means from said respective bays; and wherein:
said duct assembly includes:
   a first duct; and
   a second duct,
said inlet means includes:
a first inlet connecting said first duct to the first bay of said first plurality of adjacent bays at a point remote from said opening in said common wall connecting said first bay with an adjacent bay to provide air flow through substantially all portions of said first bay; and
a second inlet connecting said second duct to a first bay of said second plurality of adjacent bays at a point remote from said opening in said common wall connecting said first bay with an adjacent bay to provide air flow through substantially all portions of said first bay;
said outlet means includes:
a first outlet connecting said most remote bay of said first plurality of adjacent bays to said air conditioning chamber at a point in said remote bay, which is offset from the opening in the common wall between said remote bay and the next adjacent bay, to provide air flow through substantially all portions of said remote bay; and
a second outlet connecting the bay of said second plurality, which is most remote from the first bay of said second plurality of adjacent bays at a point in said remote bay, which is offset from the opening in the common wall between said remote bay and the next adjacent bay, to provide air flow through substantially all portions of said remote bay, to said air conditioning chamber; and
said blower means includes:
a first blower for circulating air seriatim through said first duct, said first plurality of bays and said air conditioning chamber; and
a second blower for circulating air seriatim through said second duct, said second plurality of bays and said air conditioning chamber.

* * * * *

UNITED STATES PATENT OFFICE
CERTIFICATE OF CORRECTION

Patent No. 3,820,507     Dated June 28, 1974

Inventor(s) James G. Dugan, Albert S. Hancock, Jr., et al

It is certified that error appears in the above-identified patent and that said Letters Patent are hereby corrected as shown below:

Change the name of the Assignee on the front page from "Robbin Incubator Co." to read ---Robbins Incubator Co.---.

Signed and sealed this 19th day of November 1974.

(SEAL)
Attest:

McCOY M. GIBSON JR.     C. MARSHALL DANN
Attesting Officer       Commissioner of Patents